(12) United States Patent
Chambers

(10) Patent No.: US 8,045,973 B2
(45) Date of Patent: Oct. 25, 2011

(54) MOBILE DEVICE SUBJECT TO A COMMUNICATION RESTRICTION RESPONDING TO A PRIORITY CALL

(75) Inventor: Michael D. Chambers, Plainfield, IL (US)

(73) Assignee: Alcatel Lucent, Paris (FR)

( * ) Notice: Subject to any disclaimer, the term of this patent is extended or adjusted under 35 U.S.C. 154(b) by 932 days.

(21) Appl. No.: 11/398,045

(22) Filed: Apr. 5, 2006

(65) Prior Publication Data

US 2007/0238454 A1 Oct. 11, 2007

(51) Int. Cl.
*H04Q 7/00* (2006.01)
(52) U.S. Cl. ............... 455/422.1; 455/445; 455/458; 455/452; 455/453; 455/512
(58) Field of Classification Search ............... 455/422.1, 455/445, 404, 458, 528, 404.1, 452–453, 455/512
See application file for complete search history.

(56) References Cited

U.S. PATENT DOCUMENTS

| | | | | |
|---|---|---|---|---|
| 5,966,662 A * | 10/1999 | Murto | ............ | 455/458 |
| 6,014,556 A * | 1/2000 | Bhatia et al. | ............... | 455/404.1 |
| 6,321,093 B1 * | 11/2001 | Dalal | ............ | 455/512 |
| 7,565,161 B2 * | 7/2009 | Sliva | ............... | 455/512 |
| 2002/0065082 A1 * | 5/2002 | Yegani et al. | ............... | 455/452 |
| 2002/0128033 A1 * | 9/2002 | Burgess | ............... | 455/528 |
| 2003/0157923 A1 * | 8/2003 | Tani | ............... | 455/404 |
| 2004/0029592 A1 * | 2/2004 | Shyy et al. | ............... | 455/453 |
| 2004/0176066 A1 * | 9/2004 | Binzel et al. | ............... | 455/404.1 |
| 2004/0198357 A1 * | 10/2004 | Plyle et al. | ............... | 455/435.3 |

* cited by examiner

*Primary Examiner* — Charles Appiah
*Assistant Examiner* — Michael Vu
(74) *Attorney, Agent, or Firm* — Duft, Bornsen & Fishman, LLP

(57) ABSTRACT

A mobile device and associated methods are disclosed that allow a mobile device subject to a communication restriction from a wireless network to respond to a priority call. If a call in the wireless network is destined for the mobile device, then the mobile device receives a paging request message for the call from the wireless network. The mobile device then determines if the call is a priority call. If the call is a priority call, then the mobile device determines that it is exempt from the communication restriction. The mobile device may be exempt for this particular call, for a defined time period, etc. The mobile device may then transmit a response message to the wireless network to initiate the setup of the priority call to the mobile device.

19 Claims, 4 Drawing Sheets

MOBILE DEVICE SUBJECT TO A COMMUNICATION RESTRICTION RESPONDING TO A PRIORITY CALL

BACKGROUND OF THE INVENTION

1. Field of the Invention

The invention is related to the field of communications, and in particular, to allow a mobile device that is subject to a communication restriction to respond to a priority call.

2. Statement of the Problem

Wireless networks have integrated methods of issuing communication restrictions to control the network flow during special circumstances, such as a network malfunction, overload, or at other times when the performance of the network is jeopardized. A communication restriction when applied to a mobile device of a wireless network restricts its ability to initiate or respond to network communications to connect a call. One example of a communication restriction is the access class barring technique used by Universal Mobile Telecommunication System (UMTS), Global System for Mobile Communications (GSM), and other compatible communication service providers. The $3^{rd}$ Generation Partnership Project (3GPP) Technical Specification Group Services and System Aspects; Service accessibility (Release 7) document discusses this in Chapter 4, Access Control (3GPP TS 22.011 V7.1.0, found at www.3gpp.org). The specification allocates a set of access classes and requires that a GSM compatible mobile device be a member of at least one access class. A mobile device is under a communication restriction/access class bar when the mobile device receives an access control restriction broadcast by the wireless network which contains the access class for the mobile device. While the GSM compatible mobile device is subject to an access class bar the mobile device will continue to receive and monitor paging requests from the wireless network. However, the mobile device is prohibited from responding to a paging request and cannot make or receive a call. The wireless network will continue to monitor the network traffic and as the situation improves the wireless network will take steps to remove the communication restrictions.

The special circumstances resulting in the use of a communication restriction are varied. A malfunction caused by component failure, physical damage to the network, or other electro-mechanical failure may result in a need to restrict network traffic. An overload can be caused by something as simple as a shopping mall around the holiday season or as complex as an emergency situation, but in any case is caused by a large number of users in a particular area concurrently attempting to place phone calls. Whether malfunction or overload, users are subject to a communication restriction and cannot make or receive calls.

At the same time the need to provide individuals and organizations who respond to man-made and natural disasters with priority communication has long been recognized. Priority services are made available to authorized government, emergency and other key personnel so that in times of network congestion priority calls can be placed. Priority calls receive specialized processing from the wireless network to assure that each priority call is connected over the next available channel. By doing so both the expediency and probability of establishing a connection with crucial personnel is much improved. One example of a priority service is Wireless Priority Services (WPS). WPS is an enhancement to wireless communication services that provides for National Security and Emergency Preparedness (NS/EP) calls. Another example is Government Emergency Telecommunications System (GETS). GETS is for primarily handling landline initiated priority calls. WPS and GETS are complementary to each other and both use the same NS/EP protocol to initiate a priority call. WPS and GETS are discussed as just two examples of priority services.

Thus, a potential conflict may occur between communication restrictions and priority services. As an example, a wireless network may be congested as users close to an emergency initiate calls, thereby causing the network to invoke communication restrictions. But at the same time authorized personnel (i.e., priority service users) may be attempting to contact a public service user who may be close to the same incident by using a priority service. This situation would cause the mobile device being used by the public service user to restrict communication such that the public service user could not respond to the priority call in a timely manner.

SUMMARY OF THE SOLUTION

The invention solves the above problems and other problems by enabling a mobile device subject to a communication restriction from a wireless network to determine that a pending call is a priority call and determine that the mobile device is temporarily exempt from the communication restriction if the call is a priority call. For example, an authorized user of a priority service initiates a priority call to the user of a mobile device. The authorized user is unaware that the mobile device he or she called is subject to a communication restriction. The invention advantageously allows the user of the mobile device subject to a communication restriction to answer the priority call, where the priority call would have previously gone unanswered due to the communication restriction.

One embodiment is a method of operating a mobile device communicating with a wireless network. The mobile device is under a communication restriction from the wireless network. If a call in the wireless network is destined for the mobile device, then the mobile device receives a paging request message for the call from the wireless network. The mobile device then determines if the call is a priority call. The priority call may have been initiated by a service provided by the wireless network, such as WPS or GETS. If the call is a priority call, then the mobile device determines that it is exempt from the communication restriction. The mobile device may be exempt for this particular call, for a defined time period, etc. The mobile device may then transmit a response message to the wireless network to initiate setup of the priority call to the mobile device.

The invention may include other exemplary embodiments described below.

DESCRIPTION OF THE DRAWINGS

The same reference number represents the same element on all drawings.

DETAILED DESCRIPTION OF THE INVENTION

FIGS. 1-4 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below may be combined in various ways to form multiple variations of the invention. As a result, the invention is not limited to the specific embodiments described below, but only by the claims and their equivalents.

Figure 1:
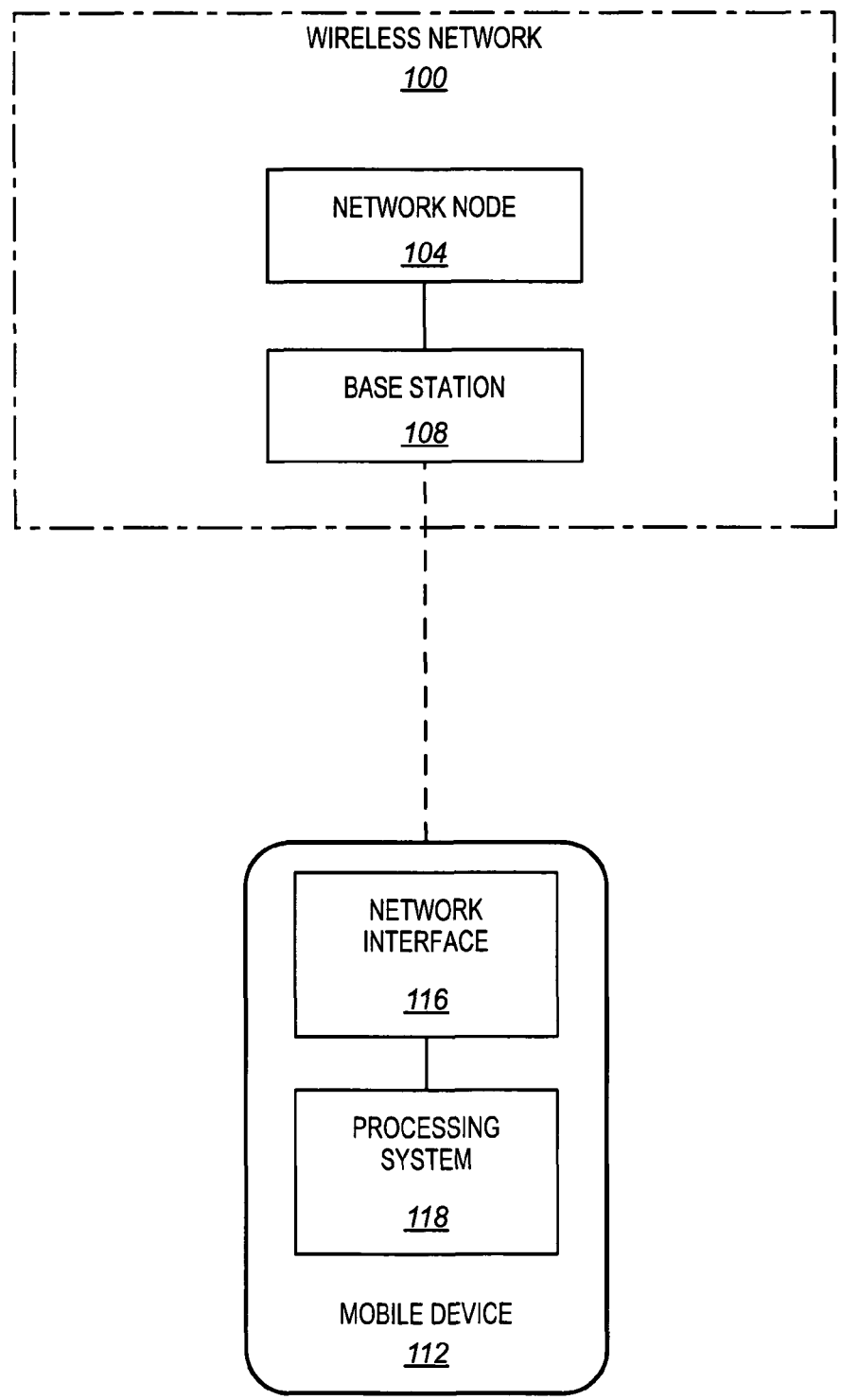
FIG. 1 illustrates a mobile device in communication with a wireless network in an exemplary embodiment of the invention.

FIG. 1 illustrates a mobile device 112 in communication with a wireless network 100 in an exemplary embodiment of the invention. Mobile device 112 comprises any device configured to communicate via wireless signals, such as a cell phone, a PDA, etc. Mobile device 112 includes network interface 116 for transmitting and receiving voice calls, data messages or other communications provided by wireless network 100. Mobile device 112 also includes processing system 118 for processing messages, data and other information. Processing system 118 could comprise a computer microprocessor, logic circuit, or some other processing device.

Wireless network 100 comprises any wireless network operable to provide voice and/or data communications, such as a cellular network, PCS network, etc. Wireless network 100 includes one or more network nodes 104 and one or more base stations 108. Base station 108 is configured to provide wireless service to mobile device 112 and a plurality of other mobile devices not shown. Base station 108 may communicate with mobile device 112 using Universal Mobile Telecommunications System (UMTS), Global System for Mobile Communication (GSM), Code Division Multiple Access (CDMA), Time Division Multiple Access (TDMA), 802.11 WiFi, 802.16 WiMax, BlueTooth (Registered), satellite, packet radio, or other wireless methods compatible with mobile device 112.

The number of calls made on wireless network 100 can reach a level that jeopardizes the integrity of wireless network 100. When this occurs, wireless network 100 may control the network traffic by applying communication restrictions to mobile devices, such as mobile device 112. While mobile device 112 is subject to a communication restriction it will continue to receive and monitor paging requests from the wireless network 100. However, mobile device 112 is prohibited from responding to a paging request and cannot make or receive a call.

Figure 2:
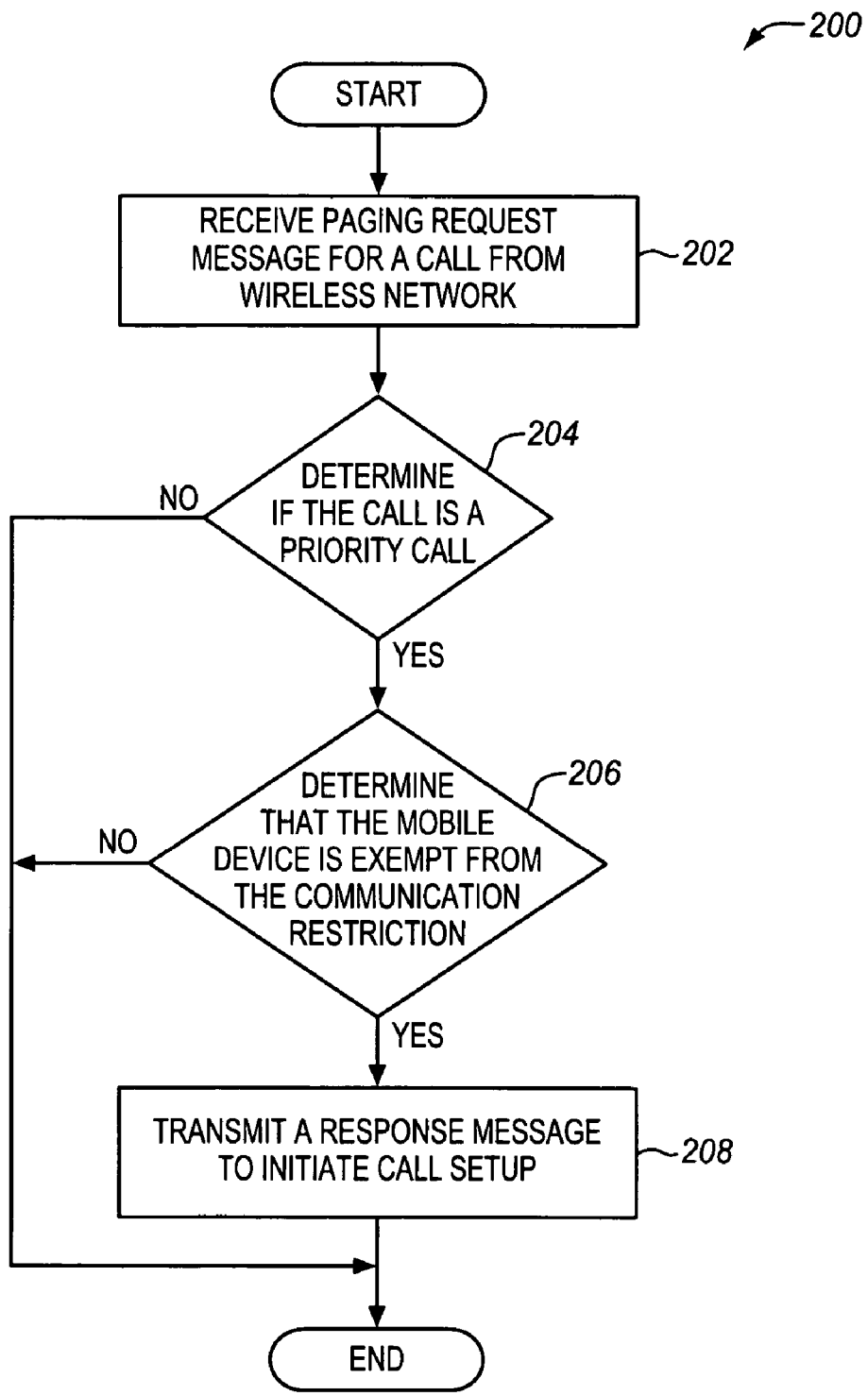
FIG. 2 is a flow chart illustrating a method of operating a mobile device subject to a communication restriction in an exemplary embodiment of the invention.

Assume a user of wireless network 100, or other communication network communicating with wireless network 100, initiates a call to mobile device 112 while mobile device 112 is under the communication restriction. The user may be another public user of wireless network 100, or an authorized user of a priority service such as WPS or GETS. FIG. 2 is a flow chart illustrating a method 200 of operating mobile device 112 subject to the communication restriction in an exemplary embodiment of the invention. The steps of the flow chart in FIG. 2 are not all inclusive and may include other steps not shown.

In step 202 of method 200, network interface 116 of mobile device 112 receives a paging request message for the call from wireless network 100. Network interface 116 may also receive other signals and/or data prior to, during or after receiving the paging request message from wireless network 100. The other signals and/or data may be used to indicate priority, prioritize queuing, or for other purposes and may include a priority signal accompanying the paging request message or a priority flag included in the paging request message.

In step 204, processing system 118 determines if the call is a priority call. In one embodiment of the invention, processing system 118 may process the paging request message to determine if the call is a priority call. In other embodiments, processing system 118 may determine the paging request message was accompanied by a priority signal in determining that the call is a priority call. Alternatively, the paging request message may include a priority flag and processing system 118 may process the priority flag in determining that the call is a priority call. If processing system 118 determines that the call is not a priority call, then mobile device 112 continues operating subject to the communication restriction.

If processing system 118 determines that the call is a priority call, then processing system 118 determines that the mobile device 112 is exempt from the communication restriction in step 206. Being exempt means that the mobile device 112 is not subject to the communication restriction. In one embodiment of the invention, processing system 118 may determine that mobile device 112 is exempt from the communication restriction for this particular priority call. In other embodiments, processing system 118 may determine that mobile device 112 is exempt from the communication restriction for a defined time period or for a defined number of calls. In step 206, processing system 118 may determine that special circumstances warrant further modification to the exemption from the communication restriction so that mobile device 112 may respond to all calls, may allow the user of mobile device 112 to initiate calls, or may allow other modifications to the exemption that are responsive to the special circumstances.

Responsive to mobile device 112 being exempt from the communication restriction, mobile device 112 may transmit a response message to wireless network 100 to initiate call setup for the priority call in step 208. Normal call flow may then continue between the user of mobile device 112 and the caller who placed the priority call after setup.

Figure 3:
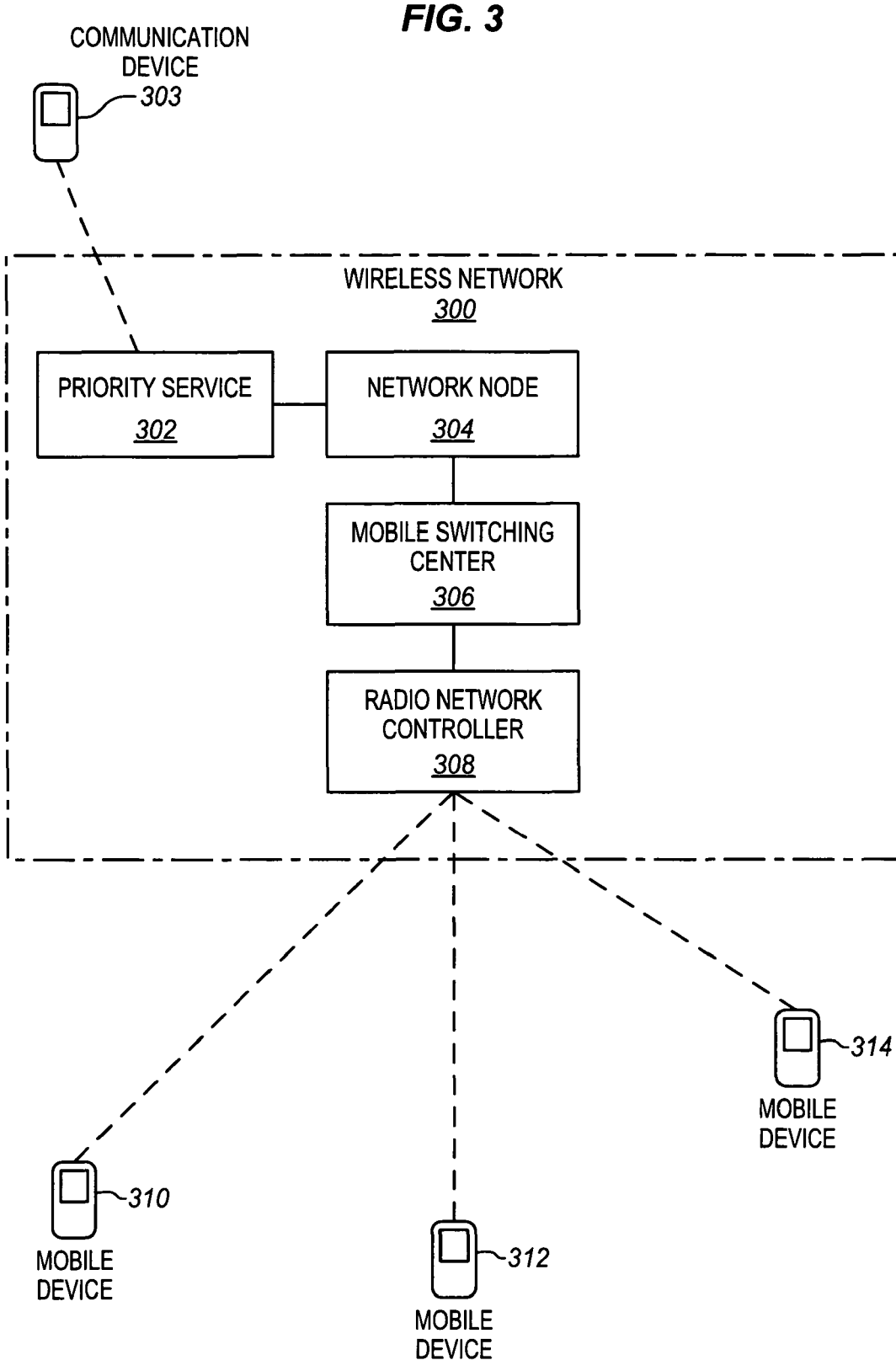
FIG. 3 illustrates mobile devices in communication with a wireless network in an exemplary embodiment of the invention.

FIG. 3 illustrates mobile devices in communication with a wireless network 300 in an exemplary embodiment of the invention. Wireless network 300 comprises any wireless network operable to provide voice and/or data communications, such as a cellular network, PCS network, etc. Wireless network 300 provides a priority service 302 and includes one or more network nodes 304, one or more Mobile Switching Centers (MSC) 306, and one or more Radio Network Controllers (RNC) 308. RNC 308 is configured to provide wireless service to mobile devices 310, 312 and 314. RNC 308 may communicate with mobile devices 310, 312 and 314 using UMTS.

Wireless network 300 provides priority services 302 and may provide other network services, servers, and systems not shown. Examples of priority services 302 include Wireless Priority Service (WPS) and Government Emergency Telecommunications System (GETS). Priority service 302 facilitates the placing of priority calls by authorized personnel of wireless network 300 to other public service users of wireless network 300.

Figure 4:
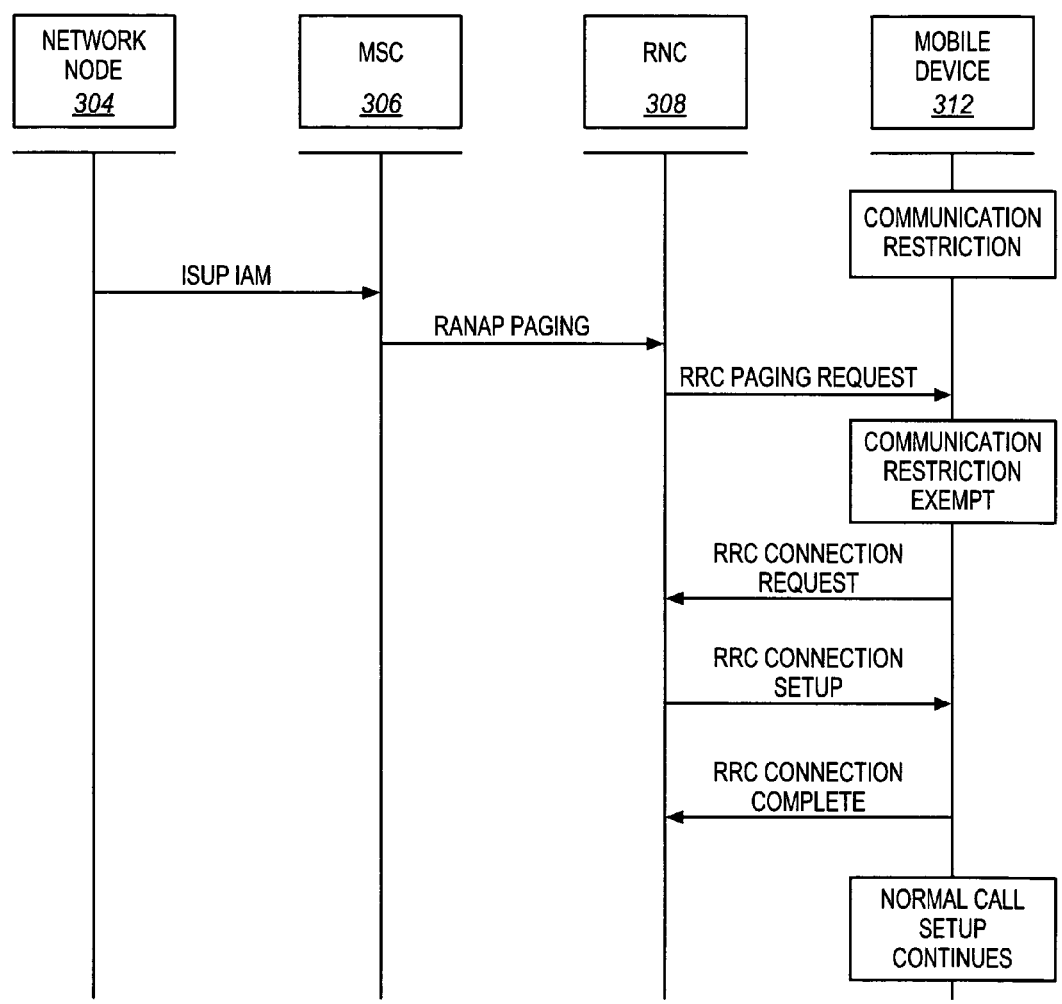
FIG. 4 is a message diagram illustrating communication between a wireless network and a mobile device in response to a priority call in an exemplary embodiment of the invention.

Assume for example that an emergency situation has occurred near mobile device 312 resulting in a network overload. Responsive to the network overload, wireless network 300 broadcasts a UMTS access class bar message (or communication restriction). Mobile devices 310, 312 and 314 each receive an access class bar message and are then subject to restricted communication if their access classes are included in the message. The access class bar on mobile devices 310, 312 and 314 restricts each of the mobile devices from making or receiving a call. While mobile device 312 is subject to the access class bar, further assume that an authorized user of priority service 302 uses communication device 303 to place a priority call to a user of mobile device 312 who is crucial to responding to the emergency. Priority service 302 then initiates a priority request for the priority call. FIG. 4 is a message diagram illustrating communication between wireless network 300 and mobile device 312 in response to a priority call in an exemplary embodiment of the invention. FIG. 4 illustrates one embodiment and the invention is not limited to this embodiment.

Responsive to the priority request from priority service 302, network node 304 transmits an ISDN User Part (ISUP) Initial Address Message (IAM) that includes a category parameter set to "NS/EP Call". The ISUP IAM may also include a precedence parameter. The ISUP IAM is then received by MSC 306. Responsive to the ISUP IAM, MSC 306 transmits a Radio Access Network Application Part (RANAP) paging message with priority indication to RNC 308. Responsive to the RANAP paging message, RNC 308 broadcasts a Radio Resource Control (RRC) paging request message for call termination with priority indication. The RRC paging request message is then received by mobile device 312. Mobile device 312 determines if the RRC paging request message is for call termination. If the RRC paging request message is for call termination, then mobile device 312 determines if the call was indicated as a priority call. If the RRC paging request is indicated as priority, then mobile device 312 determines that it is exempt from the access class bar.

Responsive to the determination that mobile device 312 is exempt from the access class bar, mobile device 312 transmits an RRC connection request to RNC 308. Mobile device 312 then receives a RRC connection setup from RNC 308, to which mobile device 312 responds with a RRC connection complete. Normal call setup may then continue after this point in the call flow and the call from the authorized user of communication device 303 may be completed to the crucial personnel using mobile device 312.

Although specific embodiments were described herein, the scope of the invention is not limited to those specific embodiments. The scope of the invention is defined by the following claims and any equivalents thereof.

I claim:

1. A method of operating a mobile device subject to a communication restriction from a wireless network, the method comprising:
   receiving a paging request message for a call from said wireless network;
   determining if said call is a priority call;
   determining that said mobile device is exempt from said communication restriction responsive to determining that said call is a priority call, and
   wherein said paging request message includes a priority flag and wherein determining if said call is a priority call comprises processing said priority flag to determine that said call is a priority call.

2. The method of claim 1, further comprising:
   transmitting a response message to said wireless network responsive to said determination that said mobile device is exempt from said communication restriction, wherein said response message initiates call setup of said priority call to said mobile device.

3. The method of claim 1, further comprising:
   receiving a priority signal from said wireless network in addition to said paging request message; and
   wherein determining if said call is a priority call comprises processing said priority signal to determine that said call is a priority call.

4. The method of claim 1, wherein determining said mobile device is exempt from said communication restriction comprises determining that said mobile device is exempt from said communication restriction for the priority call.

5. The method of claim 1, wherein determining said mobile device is exempt from said communication restriction comprises determining that said mobile device is exempt from said communication restriction for a defined period of time.

6. The method of claim 1, wherein determining said mobile device is exempt from said communication restriction comprises determining that said mobile device is exempt from said communication restriction for a defined number of calls.

7. The method of claim 1 wherein said communication restriction comprises an access class bar and wherein said wireless network comprises a UMTS wireless network.

8. The method of claim 1, wherein said paging request message is initiated by a priority service provided by said wireless network.

9. A mobile device subject to a communication restriction from a wireless network, said mobile device comprising:
   a network interface adapted to receive a paging request message for a call from said wireless network; and
   a processing system coupled to said network interface and adapted to determine if said call is a priority call responsive to receipt of said paging request message, and
   determine that said mobile device is exempt from said communication restriction responsive to determining that said call is a priority call, and
   wherein said paging request message includes a priority flag and wherein determining if said call is a priority call comprises processing said priority flag to determine that said call is a priority call.

10. The mobile device of claim 9 wherein said processing system is further adapted to:
    transmit a response message to said wireless network responsive to said determination that said mobile device is exempt from said communication restriction, wherein said response message initiates call setup of said priority call to said mobile device.

11. The mobile device of claim 9 wherein said network interface is further adapted to
    receive a priority signal from said wireless network in addition to said paging request message and wherein said processing system is further adapted to process said priority signal to determine that said call is a priority call.

12. The mobile device of claim 9 wherein said paging request message includes a priority flag and wherein said processing system is further adapted to process said priority flag to determine that said call is a priority call.

13. The mobile device of claim 9, wherein said processing system is further adapted to determine that said mobile device is exempt from said communication restriction for the priority call.

14. The mobile device of claim 9 wherein said processing system is further adapted to determine that said mobile device is exempt from said communication restriction for a defined period of time.

15. The mobile device of claim 9 wherein said processing system is further adapted to determine that said mobile device is exempt from said communication restriction for a defined number of calls.

16. The mobile device of claim 9 wherein said communication restriction comprises an access class bar and wherein said wireless network comprises a UMTS wireless network.

17. The mobile device of claim 9 wherein said paging request message is initiated by a priority service provided by said wireless network.

18. A method of operating a mobile device subject to an access class bar from a UMTS wireless network, the method comprising:

receiving a Radio Resource Control (RRC) priority paging request message from said UMTS wireless network;

determining if said priority paging request message is for a priority call;

determining if said priority paging request message is for call termination;

determining that said mobile device is exempt from said access class bar responsive to said determination that said priority paging request message is for a priority call and responsive to said determination that said priority paging request message is for call termination; and transmitting an RRC response message to said UMTS wireless network wherein said response message initiates call setup of said priority call to said mobile device, and wherein said paging request message includes a priority flag and wherein determining if said call is a priority call comprises processing said priority flag to determine that said call is a priority call.

19. The method of claim 18, further comprising:

receiving a priority signal from said wireless UMTS network in addition to said priority paging request message; and wherein determining if said priority paging request message is for a priority call comprises processing said priority signal to determine that said priority paging request message is for a priority call.

\* \* \* \* \*